(12) United States Patent
Nordstrom et al.

(10) Patent No.: US 8,933,627 B2
(45) Date of Patent: Jan. 13, 2015

(54) SYSTEMS AND METHODS FOR CONTROLLING VEHICLE LIGHTING

(75) Inventors: Erik C. Nordstrom, Troy, MI (US);
Stephen M. Cichy, Lapeer, MI (US);
Mehrdad Teimorzadeh, Troy, MI (US);
Charles J. Swan, Farmington Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 250 days.

(21) Appl. No.: 13/414,979

(22) Filed: Mar. 8, 2012

(65) Prior Publication Data
US 2013/0234593 A1 Sep. 12, 2013

(51) Int. Cl.
*B60Q 1/00* (2006.01)
*B60Q 3/00* (2006.01)

(52) U.S. Cl.
USPC ............. 315/80; 315/77; 315/82; 315/149; 315/150

(58) Field of Classification Search
USPC .............. 315/77, 80, 82, 83, 149, 150, 158; 340/425.5, 430, 457.2, 545.3
See application file for complete search history.

(56) References Cited

U.S. PATENT DOCUMENTS

| | | | | |
|---|---|---|---|---|
| 5,537,003 A | * | 7/1996 | Bechtel et al. | 315/82 |
| 6,014,207 A | * | 1/2000 | Suzuki et al. | 356/229 |
| 6,711,481 B1 | * | 3/2004 | King et al. | 701/36 |
| 7,825,600 B2 | * | 11/2010 | Stam et al. | 315/82 |
| 2010/0213846 A1 | * | 8/2010 | Thomas | 315/82 |

* cited by examiner

*Primary Examiner* — Douglas W Owens
*Assistant Examiner* — Thai Pham
(74) *Attorney, Agent, or Firm* — Cantor Colburn LLP

(57) ABSTRACT

A system for controlling a lighting system for a vehicle includes an ambient light sensor operable for detecting a level of ambient light and a lighting circuitry. The system also includes a logical control unit that receives input signals from a vehicle control unit, a user input device and the ambient light sensor. The logical control unit controls a voltage on the lighting circuitry to provide a minimum voltage based on the one or more input signals.

18 Claims, 3 Drawing Sheets

SYSTEMS AND METHODS FOR CONTROLLING VEHICLE LIGHTING

FIELD OF THE INVENTION

The subject invention relates generally to systems and methods for controlling a lighting system for a vehicle, and more specifically to systems and methods for controlling a lighting system for a vehicle based on ambient light conditions.

BACKGROUND

Motor vehicles today have lighting systems that include one or more interior and exterior lights that are used for a variety of purposes. Generally, the interior lights are designed to provide enough light to ensure that the operator of the motor vehicle can see all of the controls needed to operate the motor vehicle. While the exterior lights are designed to ensure that the operator of the motor vehicle can operate the motor vehicle at night, or in other reduced visibility environments such as fog. In general, these lighting systems are designed to utilize an approximately 12V power supply for powering both the interior and exterior lights. Currently, many motor vehicle lighting systems include an ambient light sensor that is used to automatically turn on or off the exterior vehicle lights in response to the detected ambient light being above or below a threshold value. In addition, current lighting systems for operating interior lights on a motor vehicle may allow the operator to manually adjust the intensity or brightness of one or more of the interior lights.

In many cases, the amount of light required by a user to safely operate the motor vehicle may be less than the amount of light provided by the interior and/or exterior lights of the lighting systems while in an On state. Accordingly, currently available motor vehicle lighting systems waste energy in the form of light produced by both the interior and exterior lights in excess of the light needed by the operator of the motor vehicle.

SUMMARY OF THE INVENTION

In one exemplary embodiment, a system for controlling a lighting system for a vehicle includes an ambient light sensor operable for detecting a level of ambient light and a lighting circuitry. The system also includes a logical control unit operable for receiving one or more input signals from a vehicle control unit, a user input device and the ambient light sensor. The logical control unit responsively controls a voltage on the lighting circuitry to provide a minimum voltage based on the one or more input signals.

In another exemplary embodiment, a method for controlling a lighting system for a vehicle includes receiving a first input signal from an ambient light sensor indicative of a level of ambient light. The method also includes receiving a second input signal from a vehicle control unit indicative of one or more operating conditions of the vehicle and receiving a third input signal from a user input device indicative of a desired operational mode of the lighting system. The method further includes responsively controlling a voltage on a lighting circuitry to provide a minimum voltage based on the first, second and third input signals.

In yet another exemplary embodiment, a system for controlling a lighting system for a vehicle includes an ambient light sensor operable for detecting a level of ambient light and a lighting circuitry having one or more interior lights and one or more exterior lights. The system also includes a logical control unit operable for providing an output voltage to the lighting circuitry in response to one or more input signals received from a vehicle control unit, a user input device and the ambient light sensor. Wherein the one or more interior lights and one or more exterior lights provide a minimum level of the required brightness for operation of the vehicle.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

The following description is merely exemplary in nature and is not intended to limit the present disclosure, its application or uses.

Lights in most motor vehicles are selected to provide a sufficient amount of light in all ambient lighting conditions including conditions with very little ambient light. Consequently, when these lights are utilized in conditions with increased amounts of ambient light, the lights generate more light than is needed by the operator and waste energy. In one example, a motor vehicle includes a light bulb that has as fixed resistance of approximately 4.12 ohms. Accordingly, when the light bulb is operated under a load of 12 V the power consumed by the light bulb is approximately 35 W. By operating the same light bulb under loads of 8V or 10V, the amount of power consumed by the light bulb would be approximately 15.5 W or 24.3 W, respectively. This would result in a power savings of approximately 19.5 W or 10.7 W, respectively. In addition, many current motor vehicle lighting systems periodically operate the lights at power levels in excess of 12V, which not only results in wasted energy but may also decrease the lifecycle of the lights.

Figure 1:
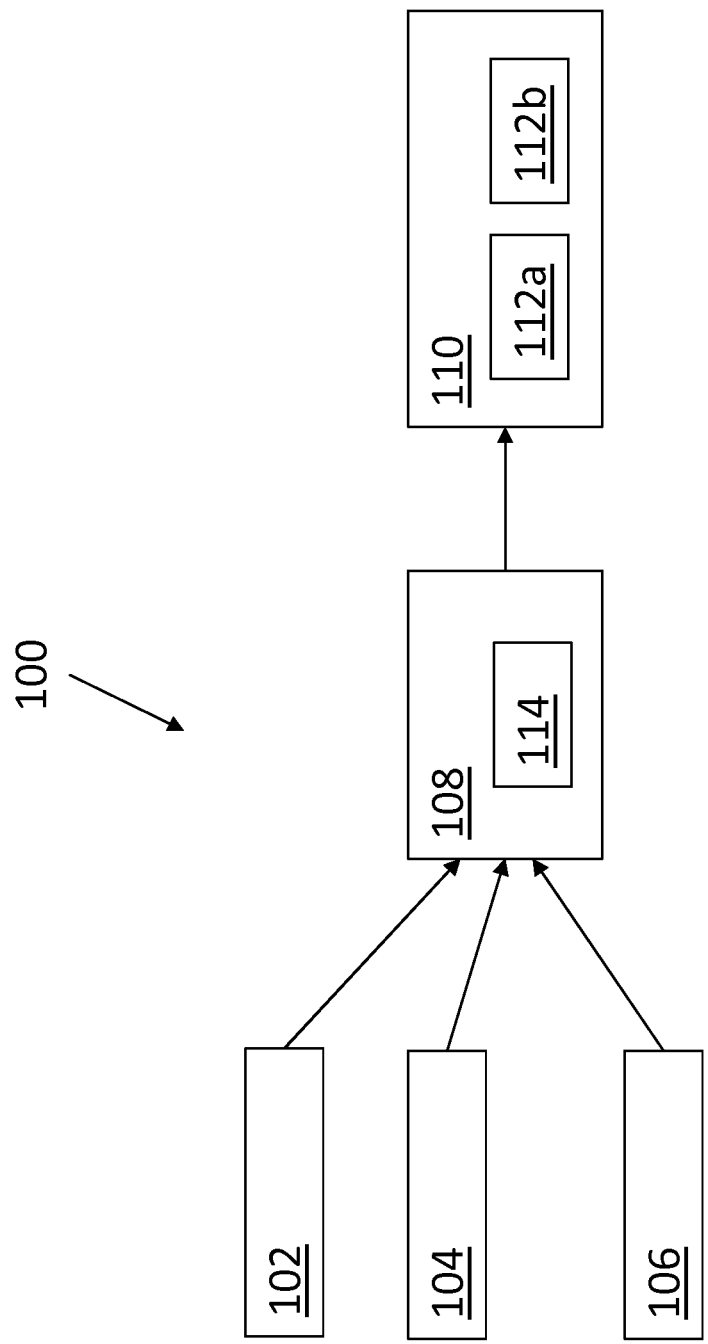
FIG. 1 is a block diagram of a system for controlling a vehicle lighting system in accordance with an exemplary embodiment.

Referring now to FIG. 1, a block diagram of a lighting control system 100 for controlling a motor vehicle lighting system in accordance with an exemplary embodiment is shown. The system also includes an ambient light sensor 102, a user input device 104 and a vehicle control unit 106 which are all in communication with a logical control unit 108. In exemplary embodiments, the logical control unit 108 may receive one or more input signals from the ambient light sensor 102, the user input device 104 and/or the vehicle control unit 106. Based on the input signals received, the logical control unit 108 controls the input voltage on the lighting control circuitry 110. In exemplary embodiments, the lighting 1 circuitry 110 may include one or more interior lights 112a and/or exterior lights 112b of a motor vehicle.

In exemplary embodiments, the ambient light sensor 102 may be a photoelectric sensor, a photocell, a light-dependent resistor, or any other suitable device. The ambient light sensor 102 is used to detect ambient light or brightness in a manner similar to a human eye. In exemplary embodiments, the ambient light sensor 102 provides an input signal to the logical control unit 108 that is indicative of the ambient light conditions of the motor vehicle. The lighting control system 100 can use the input signal to responsively adjust the intensity of one or more interior lights 112a and/or exterior lights 112b of the motor vehicle. In one embodiment, the ambient light sensor 102 may provide a signal with a magnitude of between zero and five volts, with the magnitude of the signal being proportional to the detected ambient light conditions. In exemplary embodiments, the lighting control system 100 may include a plurality of ambient light sensors 102, which can be disposed in various locations about the motor vehicle.

In exemplary embodiments, the logical control unit 108 controls the input voltage on the lighting control circuitry 110 to ensure that a sufficient amount of light is produced by the interior and/or exterior lights such that the operator can safely operate the motor vehicle, while minimizing the power consumed by the lighting system. For example, the logical control unit 108 may receive a signal from the ambient light sensor 102 that indicates that the ambient light level of the motor vehicle is in daytime, or high ambient light, conditions. In response, the logical control unit 108 may responsively provide a voltage of approximately 0V to the lighting circuitry 110. In another example, the logical control unit 108 may receive a signal from the ambient light sensor 102 that indicates that the ambient light level of the motor vehicle is in night, or low ambient light, conditions. In response, the logical control unit 108 may responsively provide an input voltage of approximately 12V to the lighting circuitry 110. In yet another example, the logical control unit 108 may receive a signal from the ambient light sensor 102 that indicates that the ambient light level of the motor vehicle is in dusk, or moderate ambient light, conditions. In response, the logical control unit 108 may responsively provide an input voltage of approximately 10V to the lighting circuitry 110. In exemplary embodiments, the logical control unit 108 may include, or be in communication with, an ambient light table 114 that provides a minimum level of the required brightness of the exterior lights as a function of the detected ambient light level.

In exemplary embodiments, the user input device 104 may provide the logical control unit 108 with one or more input signals indicative of an operator desired operational mode of the lighting system. The operational modes of the lighting system may include, but are not limited to, a full power mode, an economy mode, or an off mode. When the full power mode is selected by the operator of the motor vehicle, the logical control unit 108 provides a 12V output to the lighting circuitry 110, which operates the lights at maximum brightness, regardless of the ambient light level. When the off mode is selected by the operator of the motor vehicle, the logical control unit 108 provides a 0V output to the lighting circuitry 110, regardless of the ambient light level. When the economy mode is selected by the operator of the motor vehicle, the logical control unit 108 provides an output signal of between 0-14V to the lighting circuitry 110 based on the detected ambient light level, which results in the interior and exterior lights being operated at a level of brightness based on the detected ambient light level.

In exemplary embodiments, the vehicle control unit 106 may provide the logical control unit 108 with one or more input signals indicative of one or more operating conditions of the vehicle. In one embodiment, the vehicle control unit 106 may provide an input signal to the logical control unit 108 that indicates that the lighting system 100 should be operated at a maximum brightness level. In one example, the vehicle control unit 106 may determine that one of the headlights has burned out and therefore the remaining headlight should be operated at its full brightness even in moderate ambient light conditions. In another example, a low voltage battery state of charge may not require the energy storage recharging actuator, i.e. alternator or dc-dc converter, to operate at the maximum output voltage set point. In this specific instance, but not limited to, the alternator could reduce its output voltage to an ideal voltage level optimized for interior and, or exterior lighting. By reducing the output voltage level, the lighting circuitry 110 would no longer have to pulse width modulate the lighting outputs, which would result in a continuous conduction operation of the lights. This would eliminate interior and exterior pulse width modulation power losses, increasing vehicle electrical efficiency and potentially increasing the life of the interior and exterior lights. It will be appreciated that there are a wide variety of conditions under which the vehicle control unit 106 may instruct the logical control unit 108 to operate the lighting system in either an off or a full power operating mode.

By turning on, turning off, or adjusting the intensity of the lights of the motor vehicle based on the ambient light conditions, the lighting control system 100 can conserve battery power or provide extra safety while eliminating the need for manual adjustments of both the interior and exterior lights. In exemplary embodiments, a motor vehicle lighting system may include a plurality of lights that are used to illuminate various portions of the cabin of the motor vehicle. The lights are connected to lighting control circuitry 110, which controls the voltage supplied to each of the lights. The lighting control circuitry 110 is controlled by the logical control unit 108, which is programmed to ensure the cabin of the motor vehicle is properly illuminated while also conserving power.

Figure 2:
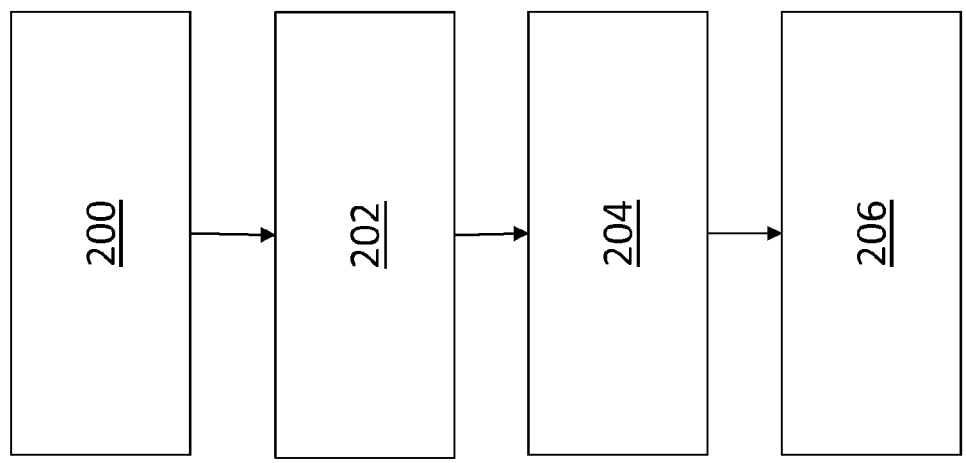
FIG. 2 is a flow diagram of a method for controlling a vehicle lighting system in accordance with an exemplary embodiment.

Referring now to FIG. 2, a flow diagram of a method for controlling a lighting system for a vehicle in accordance with an exemplary embodiment is illustrated. The method includes receiving a first input signal from an ambient light sensor indicative of a level of ambient light, as shown at block 200. The method also includes receiving a second input signal from a vehicle control unit indicative of one or more operating conditions of the vehicle, as shown at block 202. The method further includes receiving a third input signal from a user input device indicative of a desired operational mode of the lighting system, as shown at block 204. As shown at block 206, the method also includes responsively controlling a voltage on a lighting circuitry to provide a minimum voltage based on the first, second and third input signals. In exemplary embodiments, an ambient light table may be used to determine a minimum level of the required brightness of the interior and/or exterior lights as a function of the detected ambient light level.

Figure 3:
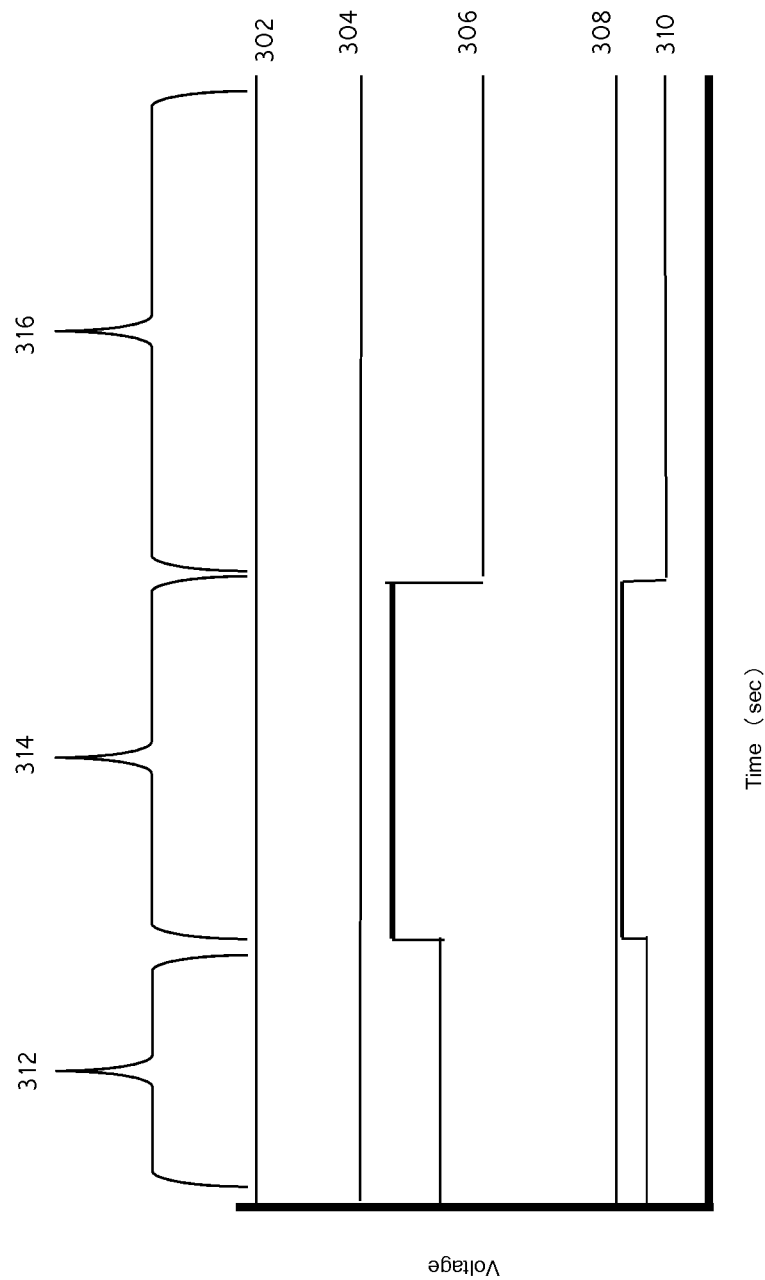
FIG. 3 is a graph illustrating a variable voltage level of lighting circuitry based on ambient light conditions.

Referring now to FIG. 3, a graph illustrating a variable voltage level of lighting circuitry based on ambient light conditions is shown. The graph illustrates various voltage levels in the motor vehicle as a function of time. The system voltages illustrated on the graph include: the maximum alternator voltage output 302; the nominal alternator voltage output 304; the lighting circuitry voltage 306; the maximum voltage generated by the ambient light sensor 308; and the voltage generated by the ambient light sensor 310. As illustrated by the graph, the lighting circuitry voltage 306 varies over time and is directly correlated to the voltage generated by the ambient light sensor 310. As shown at sections 312 and 314 of the graph, when the voltage generated by the ambient light sensor 310 increases the lighting circuitry voltage 306 also increases. Likewise, as shown at sections 314 and 316 of the graph, when the voltage generated by the ambient light sensor 310 decreases the lighting circuitry voltage 306 also decreases.

In exemplary embodiments, the lighting system may include one or more interior lights and one or more exterior lights. The lights included in the lighting system may be any suitable type such as, but not limited to, light emitting diodes, incandescent lights, halogen, or xenon lights. In exemplary embodiments, the lighting system may include various combinations of lighting types disposed throughout the interior and exterior of the motor vehicle.

In exemplary embodiments, the motor vehicle may be a hybrid vehicle or an electric vehicle. By minimizing the power consumed by the lighting system, the lighting control system 100 may increase the range of the motor vehicle. In exemplary embodiments, the lighting control system may provide an increase in the range of the motor vehicle by approximately 1%.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The flow diagrams depicted herein are just one example. There may be many variations to this diagram or the steps (or operations) described therein without departing from the spirit of the disclosure. For instance, the steps may be performed in a differing order or steps may be added, deleted or modified. All of these variations are considered a part of the claimed disclosure.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A system for controlling a lighting system for a vehicle comprising:
   an ambient light sensor operable for detecting a level of ambient light;
   a lighting circuitry comprising at least one interior light;
   a logical control unit operable for receiving one or more input signals from a vehicle control unit, a user input device and the ambient light sensor; and
   wherein the logical control unit responsively controls a voltage on the lighting circuitry to provide a minimum voltage based on the one or more input signals, wherein the minimum voltage is a variable voltage level that is selected to ensure that the at least one interior light produces a sufficient amount of light such that an operator can operate the vehicle, while minimizing a power consumed by the lighting system, wherein the minimum voltage is proportional to the one or more input signals received from the ambient light sensor.

2. The system of claim 1, wherein the ambient light sensor provides a continuous or discontinuous signal to the logical control unit indicative of the detected level of ambient light.

3. The system of claim 1, wherein one or more exterior lights are connected to the lighting circuitry.

4. The system of claim 1, wherein the user input device provides a signal to the logical control unit indicative of an operating mode of the lighting system.

5. The system of claim 4, wherein the operating modes include a full power mode, an off mode and an economy mode.

6. The system of claim 1, wherein the vehicle control unit provides a signal to the logical control unit indicative of one or more operating conditions of the vehicle.

7. The system of claim 3, wherein the logical control unit is in communication with an ambient light table that provides a minimum level of the required brightness of the one or more exterior lights as a function of the detected ambient light level.

8. A method for controlling a lighting system for a vehicle comprising:
   receiving a first input signal from an ambient light sensor indicative of a level of ambient light;
   receiving a second input signal from a vehicle control unit indicative of one or more operating conditions of the vehicle;
   receiving a third input signal from a user input device indicative of a desired operational mode of the lighting system;
   responsively controlling a voltage on a lighting circuitry comprising at least one interior light based on the first, second and third input signals, wherein the voltage is proportional to the one or more input signals received from the ambient light sensor; and
   wherein the voltage on the lighting circuitry provides a minimum light required for operation of the vehicle while minimizing a power consumed by the lighting system.

9. The method of claim 8, wherein one or more exterior lights are connected to the lighting circuitry.

10. The method of claim 8, wherein the minimum light required for operation of the vehicle is stored in an ambient light table that provides a minimum level of brightness of one or more exterior lights as a function of the level of ambient light.

11. The method of claim 8, wherein the operating modes include a full power mode, an off mode and an economy mode.

12. The method of claim 11, wherein when the operating mode is selected to be a full power operating mode the lighting circuitry provides a maximum lighting level.

13. A system for controlling a lighting system for a vehicle comprising:

an ambient light sensor operable for detecting a level of ambient light;

a lighting circuitry comprising one or more interior lights and one or more exterior lights;

a logical control unit operable for providing an output voltage to the lighting circuitry in response to one or more input signals received from a vehicle control unit, a user input device and the ambient light sensor, wherein the output voltage is proportional to the one or more input signals received from the ambient light sensor;

wherein the one or more interior lights and one or more exterior lights provide a minimum level of the required brightness for operation of the vehicle while minimizing a power consumed by the lighting system.

14. The system of claim 13, wherein the ambient light sensor provides a continuous signal to the logical control unit indicative of the detected level of ambient light.

15. The system of claim 13, wherein the user input device provides a signal to the logical control unit indicative of an operating mode of the lighting system.

16. The system of claim 15, wherein the operating modes include a full power mode, an off mode and an economy mode.

17. The system of claim 13, wherein the vehicle control unit provides a signal to the logical control unit indicative of one or more operating conditions of the vehicle.

18. The system of claim 13, wherein the logical control unit is in communication with an ambient light table that provides a minimum level of the required brightness of the one or more exterior lights as a function of the detected ambient light level.

* * * * *